(12) United States Patent
Bender et al.

(10) Patent No.: US 9,322,673 B2
(45) Date of Patent: Apr. 26, 2016

(54) POSITION SENSOR

(75) Inventors: Günther Bender, Rosbach (DE);
Werner Wallrafen, Hofheim (DE);
Stefan Kohler, Frankfurt/M (DE)

(73) Assignee: Continental Automotive GmbH, Hannover (DE)

( * ) Notice: Subject to any disclaimer, the term of this patent is extended or adjusted under 35 U.S.C. 154(b) by 1058 days.

(21) Appl. No.: 13/146,371

(22) PCT Filed: Jan. 28, 2010

(86) PCT No.: PCT/EP2010/050983
§ 371 (c)(1),
(2), (4) Date: Oct. 17, 2011

(87) PCT Pub. No.: WO2010/086360
PCT Pub. Date: Aug. 5, 2010

(65) Prior Publication Data
US 2012/0038350 A1 Feb. 16, 2012

(30) Foreign Application Priority Data
Jan. 28, 2009 (DE) .......................... 10 2009 006 529

(51) Int. Cl.
*G01D 5/20* (2006.01)
*H02K 29/08* (2006.01)
*G01D 11/24* (2006.01)

(52) U.S. Cl.
CPC .............. *G01D 5/20* (2013.01); *G01D 11/245* (2013.01); *H02K 29/08* (2013.01)

(58) Field of Classification Search
CPC ......... G01D 5/20; H02K 29/08; G01R 33/072
USPC ...... 324/207.25, 173, 178, 117 R, 117 H, 219
See application file for complete search history.

(56) References Cited

U.S. PATENT DOCUMENTS 3,499,096 A † 3/1970 Beecher
4,503,417 A * 3/1985 Bleeke ................... G01D 11/26
338/176

(Continued)

FOREIGN PATENT DOCUMENTS

DE 72 29 433 11/1972
DE 7229433 U † 11/1972

(Continued)

OTHER PUBLICATIONS

"Heat Staking—Staking plastic using heat and pressure", Miyachi Unitek Corporation, Californien, 2007; 2 Pages.

(Continued)

*Primary Examiner* — Huy Q Phan
*Assistant Examiner* — Dustin Dickinson
(74) *Attorney, Agent, or Firm* — Cozen O'Connor

(57) ABSTRACT

A position sensor, preferably an angle sensor for detecting the rotational angle of a shaft. The position sensor has a lead frame on which the electronic components of the position sensor are arranged and to which they are electrically connected A plastic encapsulation enclosing at least the electronic components, thereby forming a sensor module with the lead frame, and a plurality of electrical connections of the sensor module which are formed by the lead frame and a carrier module accommodating the sensor module. The carrier module has electrical connections connected to the electrical connections of the sensor module in an electrically conducting manner. The carrier module has at least two domes between which the sensor module is arranged. The respective free ends of the domes are deformed in such manner that the sensor module is clamped fixed in its position.

22 Claims, 4 Drawing Sheets

(56) References Cited

U.S. PATENT DOCUMENTS

| | | | |
|---|---|---|---|
| 5,581,179 A * | 12/1996 | Engel | G01D 5/147 174/556 |
| 5,611,548 A * | 3/1997 | Dahlhaus | 277/574 |
| 6,225,716 B1 | 5/2001 | Sies et al. | |
| 2001/0056008 A1 * | 12/2001 | Bender | F02D 11/10 477/121 |
| 2004/0129095 A1 | 7/2004 | Churchill et al. | |
| 2004/0150144 A1 * | 8/2004 | Goepfert | F16F 1/3735 267/136 |
| 2004/0211875 A1 * | 10/2004 | Wisniewski | G01D 11/245 248/500 |
| 2005/0006548 A1 * | 1/2005 | Goh | G02F 1/133308 248/317 |
| 2007/0039397 A1 * | 2/2007 | Eaton et al. | 73/856 |
| 2009/0146031 A1 | 6/2009 | Hansel et al. | |
| 2010/0059654 A1 * | 3/2010 | Gonzalez et al. | 248/682 |
| 2010/0109654 A1 † | 5/2010 | Schneider | |

FOREIGN PATENT DOCUMENTS

| | | |
|---|---|---|
| DE | 10 2004 062 466 | 9/2005 |
| DE | 10 2004 062 466 A1 | 9/2005 |
| DE | 102004062466 A1 † | 9/2005 |
| DE | 10 2006 033 642 | 1/2008 |
| DE | 10 2006 044 052 | 4/2008 |
| DE | 10 2006 046 984 | 4/2008 |
| DE | 10 2006 046 984 A1 | 4/2008 |
| DE | 102006046984 A1 † | 4/2008 |
| GB | 1 230 537 A | 5/1971 |
| GB | 1230537 A † | 5/1971 |

OTHER PUBLICATIONS

Handbook of Plastics Joining—A Practical Guide; Plastics Design Library, New York, USA; 1997; 7 Pages.
Heat Staking—Staking Plastic Using Heat Pressure, 2007, 2 pp., Unitek Eapro.†
Michael J. Troughton, Handbook of Plastics Joining, A Practical Guide, 1997, pp. 134-136, title page, reference index.†
Third Party Observations for EP application 10711356.5/EP patent 2391868 filed Jun. 27, 2013.†
Non-patent literature filed by a third party filed in EP application No. 201199711356 (EP publication No. EP2391868) accessed on on Jan. 14, 2014 at https://register.epo.org/application?number=EP10711356&lng=en&tab=doclist.†
Observations by third parties filed in EP application No. 201199711356 (EP publication No. EP2391868) accessed at http://register.epo.org/application?number=EP10711356&lng=en&tab=doclist on Jan. 14, 2014.†

\* cited by examiner
† cited by third party

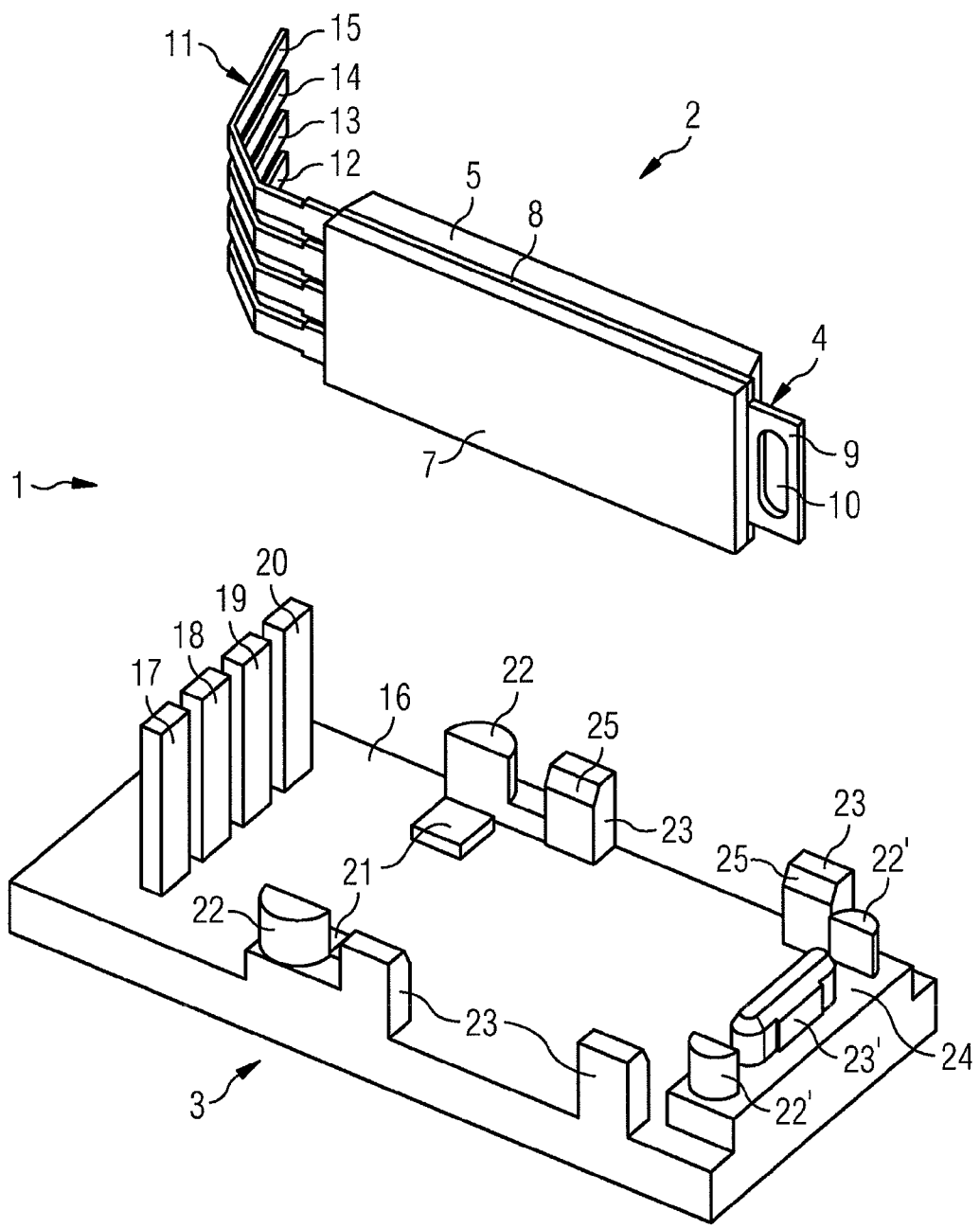

POSITION SENSOR

CROSS REFERENCE TO RELATED APPLICATION

This is a U.S. national stage of Application No. PCT/EP2010/050983, filed on Jan. 28, 2010. Priority is claimed on German Application No.: 10 2009 006 529.6, filed Jan. 28, 2009, the contents of which are incorporated here by reference.

BACKGROUND OF THE INVENTION

1. Field of the Invention

The subject matter of the present invention is a position sensor, preferably an angle sensor configured to detect a rotation angle of a shaft, comprising a leadframe on which the electronic components of the position sensor are arranged and to which said electronic components are electrically connected, an encapsulation comprising a plastic, with the encapsulation surrounding at least the electronic components and thus forming a sensor module with the leadframe, a plurality of electrical connections of the sensor module are formed by the leadframe, and a carrier module that accommodates the sensor module, with the carrier module having electrical connections that are electrically conductively connected to the electrical connections of the sensor module.

2. Description of Related Art

Position sensors of this kind are connected to an actuator, with the position sensor comprising a magnet associated with the actuator and electronic components, and is equipped with electrical plug connections, for example a so-called customer plug. The position sensors are used in internal combustion engines where they detect the rotation position of actuators for controlling the internal combustion engine, for example in the load-control system, exhaust-gas return system, air flaps in the intake section, or the adjustment system of the blades of a turbocharger. The carrier module is often in the form of a housing cover, and therefore the angle sensor itself is closed in a protected manner in a unit, with the electrical plug connections being in the form of a customer plug designed in accordance with the customers' wishes and permits electrical connection to the motor electronics system.

In this case, the actual angle sensor comprises a leadframe on which the electronic components are arranged. Electronic components are understood to be semiconductor chips, sensor elements, and interference-suppression components. Said electronic components are, in particular, at least one magnetoresistive measurement sensor or a Hall sensor, in semiconductor technology, with a chip also already associated with the evaluation electronics in the case of a measurement sensor. Furthermore, there are capacitors to improve the electromagnetic compatibility. The redundant design with two measurement sensors and two associated evaluation electronics systems is advantageous to increase reliability when detecting the rotation angle position of a throttle flap.

It is known to electrically connect the electronic components of the angle sensor directly to a leadframe and to encapsulate the leadframe without the carrier module having the electronic components with a thermoset in order to form an angle sensor module, and then to insert and secure the angle sensor module in a receptacle of the carrier module and to connect said angle sensor module to the electrical connections (DE 10 2006 046 984 A1). In this case, the angle sensor module has to be secured on the carrier module such that the securing operation is firstly stable in the long-term and secondly dimensionally and positionally stable. By way of example, screwing ensures a very reliable securing arrangement. However, securing of this kind is associated with high costs. Simpler and more cost-effective securing methods are also known but these are often unsuitable for ensuring reliable and vibration-resistant securing and positioning under the special operating conditions of an angle sensor in an internal combustion engine. The temperature range of −40° C. to 160° C. alone already places considerable demands on positioning and securing elements.

SUMMARY OF THE INVENTION

One embodiment of the present invention is based on providing a position sensor that is of as simple design as possible and can be arranged in a precise position in a manner in which it is stable in the long term, even under difficult operating conditions, such as when used in an internal combustion engine.

In one embodiment, the carrier module has at least two domes between which the sensor module is arranged, the respectively free end of the domes being deformed in such a way that the sensor module is clamped in its position.

In one embodiment of the invention the clamping of the sensor module on the carrier module by at least two domes means the sensor module is secured in a manner that is particularly simple to produce. This manner of securing allows automatic mounting of the position sensor. Surprisingly, the securing arrangement has proven to be stable in the long term despite possible concerns in respect of relaxation and the associated play which occurs over the course of the service life.

According to one embodiment, improved association of the sensor module to the carrier module is achieved by the carrier module having at least one positioning element. The at least one positioning element has the task of defining the position of the sensor module. The provision of positioning elements allows the domes to be used solely for securing purposes. Changes in the position of the sensor module relative to the carrier module as a result of input energy for heating up the domes and the forces applied during deformation are therefore avoided. The requirements in respect of position and accuracy of the domes, which requirements are lowered as a result, allow more cost-effective manufacture of the carrier part.

The at least one positioning element can be produced in a simple manner when it is integrally connected to the carrier module.

Positioning of the sensor module is particularly simple when the positioning elements are arranged on the carrier module such that the sensor module rests against the positioning elements by way of its edge.

In one embodiment, the positioning elements are arranged on the carrier module such that they secure the sensor module with respect of movement along at least one axis.

Particularly exact positioning of the sensor module is achieved with an arrangement of the positioning elements on the carrier module, which arrangement secures the sensor module with respect of the ability to move along two axes which are arranged at a right angle to one another.

The sensor module is secured on the carrier module in a particularly stable manner by the encapsulation of the leadframe having an edge in the form of a flange and surrounded by the deformed domes. The domes can be smaller on account of the low height of the flange. Furthermore, the flange has a sufficiently large surface area for securing.

According to one embodiment, the deformed domes surround the leadframe in its regions which are not encapsulated.

To this end, the leadframe has recesses in which the domes engage when the sensor module is inserted into the carrier part.

The deformation of the respectively free end of the at least two domes can be achieved in a particularly simple manner by hot-caulking or by heating by a light, infrared or laser irradiation with subsequent forming.

Exact positioning is important for problem-free operation of the position sensor. A defined position of the sensor module on the carrier module is achieved by the carrier module having at least two support elements and at least one dome being arranged on each support element, by each support element having a support area which has an elevated position relative to the carrier module, and therefore the sensor module being at a distance from the carrier module when it is supported on the support areas. The support areas provide a defined support which is influenced only slightly by tolerances.

The domes can be produced in a particularly simple manner by being integrally formed with the support elements. In the same advantageous manner, the support elements are also integrally formed with the carrier module.

On account of the support elements, a gap is created between the sensor module and the carrier module. In a further refinement, an elastic layer for damping oscillations and vibrations is arranged in said gap. Oscillations and vibrations of this kind occur when the position sensor is used on the motor and can assume values of up to 40 g. The loads acting on the securing elements can be considerably reduced by the elastic layer. The elastic layer can be a damping mat or a film comprising an elastomer, a gel or a pasty layer.

In addition to the flange of the encapsulation, the domes and positioning elements can also come into contact with other encapsulated regions of the leadframe and/or regions of the leadframe that are not encapsulated. The domes can be shorter particularly when the domes come into contact with the regions of the leadframe that are not encapsulated since the regions of the leadframe that are not encapsulated are thinner than those with an encapsulation. This has the advantage that, on account of the shorter length of the domes, the possible relaxation of said domes will be significantly lower. Similarly, thermal expansions turn out to be smaller during operation. In this case, the domes and the positioning elements are arranged in recesses in the regions of the leadframe which are not encapsulated. In advantageous refinements, these recesses are in the form of bores and elongate holes that completely surround domes and positioning elements, or are in the form of recesses which are open on one side and only partially surround the domes.

The number of recesses can be reduced if the domes and positioning elements are arranged in one recess.

In order to achieve good contact between the sensor module and the carrier module, which contact is easy to establish, the carrier module and the sensor module have contact connections that extend substantially perpendicular to the base plate of the carrier module and to the sensor module. This design allows the contact connections for establishing the electrical connections to be reached particularly easily. In particular, the contact connections of the carrier module are preferably arranged at an angle of from 50° to 130° in relation to the base plate.

According to one embodiment, the contact connections of the sensor module are bent relative to the leadframe of the sensor module by a strain-relief geometry, in particular a radius or a plurality of angled portions. The strain-relief geometry is characterized by particularly large radii or a plurality of angled portions in order to thus design the contact connections with a greater length than that which is technically required. The loads on the electrical connections between the contact connection of the carrier module and the sensor module can be reduced by virtue of the greater length of the contact connections. The loads occur in the form of forces and stresses and can be produced during mounting by tolerances and/or during operation by changes in temperature.

BRIEF DESCRIPTION OF THE DRAWINGS

Exemplary embodiments of the invention will be discussed in greater detail below with reference to the attached drawings, in which:

FIG. 1 is a perspective illustration of the carrier module together with the sensor module of a position sensor;

DETAILED DESCRIPTION OF THE PREFERRED EMBODIMENTS

Figure 2A:
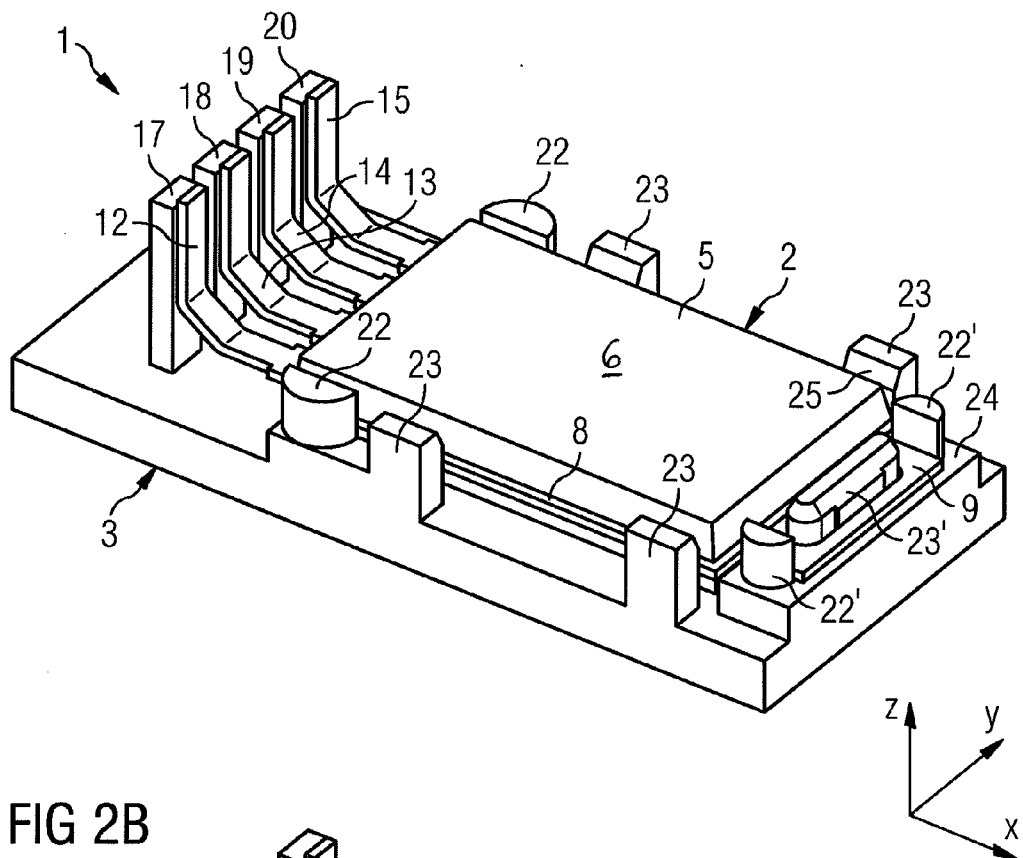
FIGS. 2a and 2b are the position sensor from FIG. 1 before and after mounting.

A position sensor in the form of an angle sensor 1 is illustrated in FIG. 1. The angle sensor 1 comprises a sensor module 2 and a carrier module 3. The sensor module 2 comprises a leadframe 4 in which the electronic components for the sensor are arranged. The leadframe 4 has an encapsulation 5, comprising plastic, in the region of the electronic components for the purpose of protecting said electronic components. The plastic for the encapsulation 5 is a plastic from the group comprising thermosets. The encapsulation 5 is designed in such a way that it has an upper face 6 and a lower face 7 and an edge which runs around between the upper face 6 and lower face and is in the form of a flange 8. The flange 8 runs approximately level with the encapsulated leadframe 4.

The leadframe 4 has a recess 10 in the form of an elongate hole at a first end 9. The leadframe 4 has electrical contact connections 12-15 at its second end 11.

The carrier module 3 comprises a base plate 16 in which electrical contact connections 17-20 are arranged. The contact connections 17-20 pass through the base plate 16, and therefore the contact connections 17-20 can be connected to electrical lines for the angle sensor 1 in the region of the lower face of the base plate 16 (not illustrated). However, the electrical contact connections 17-20 can also be a constituent part of a leadframe in the carrier module 3. The electrical contact connections 17-20 and, respectively, the leadframe form a plug connection which is formed in accordance with the customers' wishes and to which, for example, a plug for connection to the controller of an engine can be connected.

Two support elements 21, which are bounded at the edge of the base plate 6 by two domes 22, are arranged on the upper face of the base plate 16. Four positioning elements 23 are provided next to the two domes 22. A support element 24 is provided on that side of the base plate 16 which is opposite the electrical contact connections 17-20. The support element 24 has two domes 22' on its upper face. A further positioning element 23' is arranged between the two domes 22'.

Figure 2B:
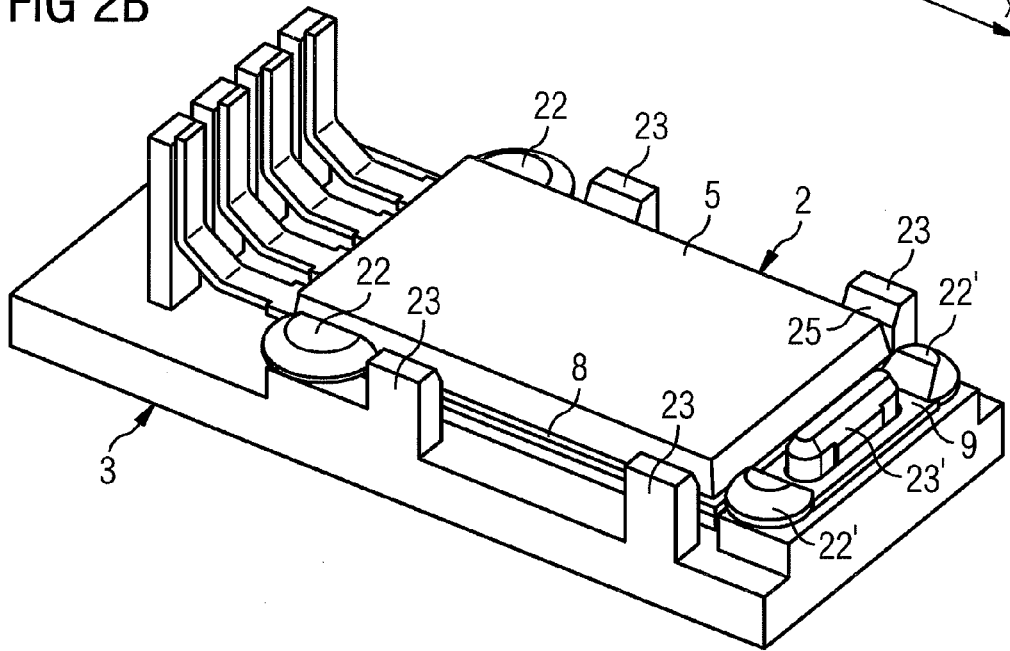

FIGS. 2a, 2b show the angle sensor 1 before and after the sensor module 2 is connected to the carrier module 3. To this end, the sensor module 2 is placed on the carrier module 3. Insertion slopes 25 on the positioning elements 3 facilitate mounting. While the support elements 21 delimit the position of the sensor module 2 in the negative z-direction, the position of the sensor module 2 in the y-direction is defined by the four positioning elements 23 on the longitudinal sides of the carrier module 3. The position of the sensor module 2 in relation to the carrier module 3 is defined in the x-direction by the positioning element 23' on that side which is averted from the electrical contact connections 17-20. The electrical contact connections 12-15 of the sensor module 2 are relatively long and angled at several points. Consequently, in spite of the fixed electrical connection to the contact connections 17-20 of the carrier module 3, said electrical contact connections 12-15 grant the sensor module 2 a certain degree of mobility, which serves to compensate for tolerances during mounting and prevents the position of the sensor module 2 from being over-determined. As shown in FIG. 2b, after the insertion of the sensor module 2 into the carrier module 3, the free ends of the domes 22, 22' are deformed by hot-caulking. Consequently, the deformed, free ends merge with the flange 8 of the encapsulation 5 and the first end 9 of the leadframe 4 in the sensor module 2. The sensor module 2 is defined in z-direction in this way.

Figure 3A:
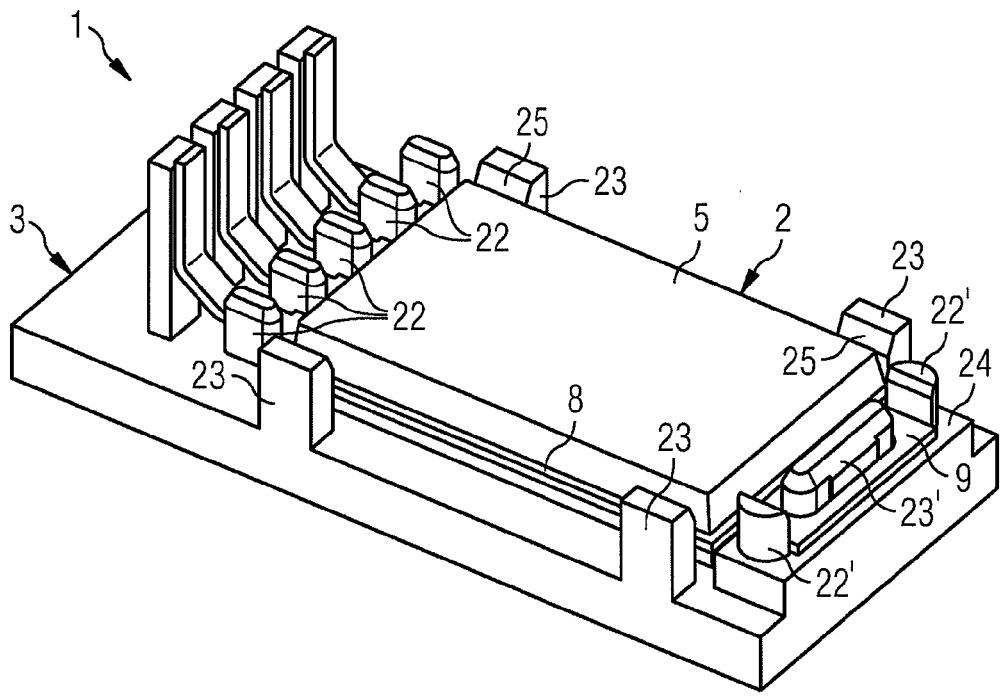
FIGS. 3a and 3b are a second embodiment of the position sensor according to FIG. 1.
Figure 3B:
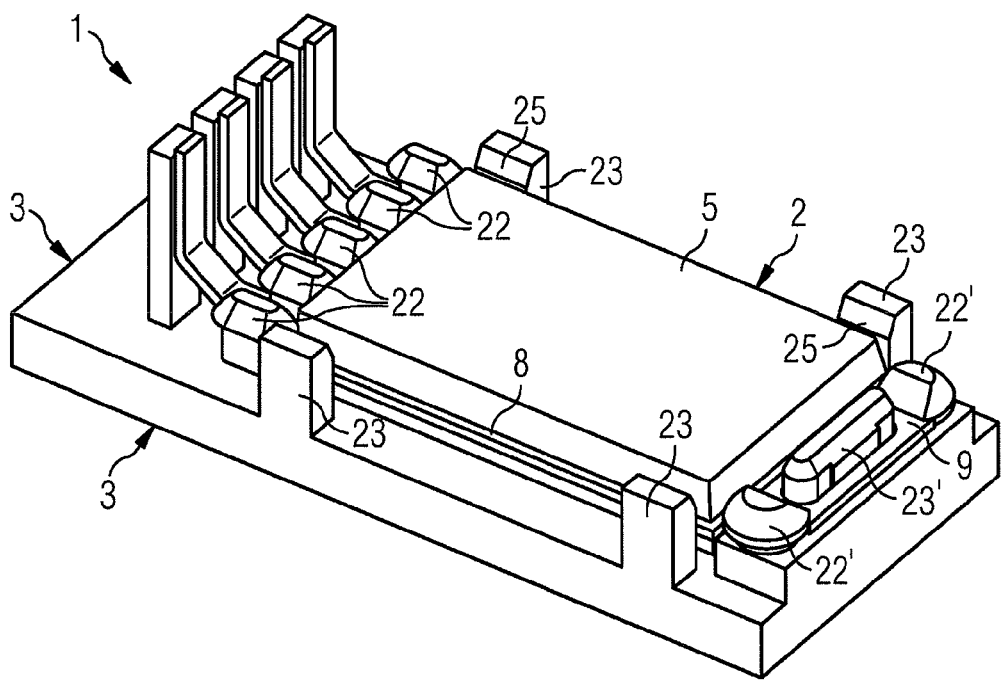

In another embodiment according to FIGS. 3a, b, the sensor module 2 is no longer secured by the domes 22 at the two longitudinal sides of the sensor module 2 but rather in the region of the electrical contact connections 12-15 of the leadframe 4. To this end, domes 22 are arranged in such a way that in each case one dome 22 is arranged between two contact connections 12-15. Although this already constitutes an adequate securing arrangement, in each case one dome 22 is also arranged on the outer sides of the two outer contact connections 12, 15.

Figure 4A:
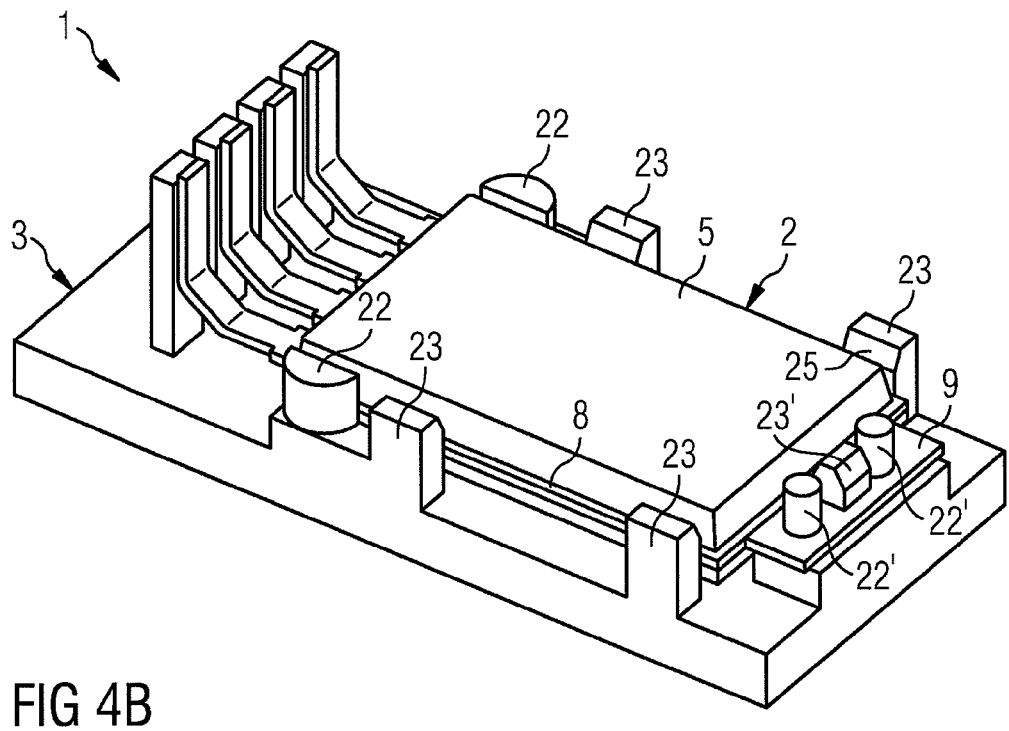
FIGS. 4a and 4b are a third embodiment of the position sensor according to FIG. 1.
Figure 4B:
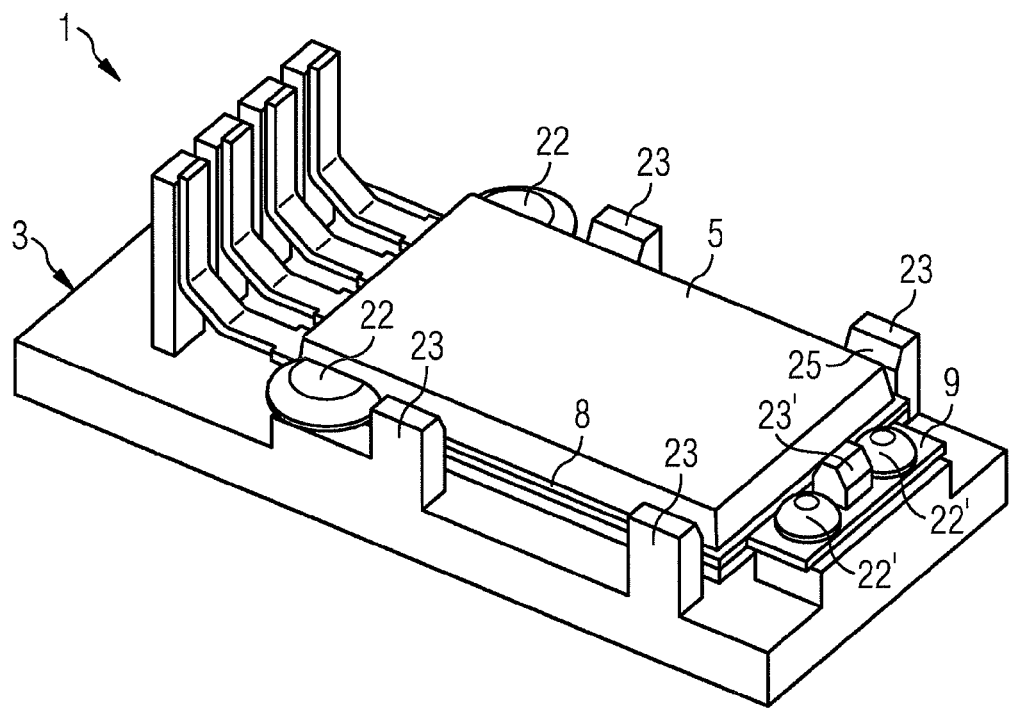

The angle sensor 1 illustrated in FIGS. 4a, b differs from the illustration in FIG. 1 in that the positioning element 23' is formed on that side of the carrier module 3 of lower width which is averted from the electrical contact connections 17-20. The domes 22' are likewise arranged at a short distance from said positioning element 23'. As a result, the domes 22' are now positioned within the elongate hole 10 in the leadframe 4.

In all the embodiments, it is possible to arrange an elastic layer in the form of an elastomeric film for damping oscillations on the upper face of the base plate 16 between the support elements 21, 24. An elastomeric film of this kind reduces the movements of the sensor module 2 relative to the carrier module 3 caused by oscillations and compensates for differing expansions of plastics and metals as a result of the different coefficients of thermal expansion.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

The invention claimed is:

1. A position sensor configured to detect a rotation angle of a shaft, comprising:
    electronic components of the position sensor;
    a leadframe on which the electronic components of the position sensor are arranged and to which said electronic components are electrically connected;
    an encapsulation comprising plastic, the encapsulation surrounding at least the electronic components forming a sensor module with the leadframe and a plurality of electrical connections of the sensor module which are formed by the leadframe, the encapsulation having a first face arranged on a first side of the leadframe, a second face opposite the first face arranged on a second side of the leadframe, and an edge face between the first face and the second face;
    a carrier module that accommodates the sensor module, the carrier module having electrical contact connections embedded therein that are electrically connected to respective ones of the plural electrical connections of the sensor module; and
    at least two domes between which the sensor module is arranged, respective free end of the domes are deformed to merge with at least one of a portion of the edge face of the encapsulation of the sensor module and a portion of the leadframe such that the sensor module is clamped in its position.

2. The position sensor as claimed in claim 1, wherein the carrier module has at least one positioning element configured to guide the sensor module.

3. The position sensor as claimed in claim 2, wherein the at least one positioning element is integrally connected to the carrier module.

4. The position sensor as claimed in claim 2, wherein the at least one positioning element is arranged on the carrier module such that the sensor module rests against the at least one positioning element by way of a respective edge of the sensor module.

5. The position sensor as claimed in claim 2, wherein the at least one positioning element is arranged on the carrier module such that the sensor module rests against the at least one positioning element by way of regions of its leadframe that are not encapsulated.

6. The position sensor as claimed in claim 2, wherein the at least one positioning element is arranged on the carrier module such that it secures the sensor module with respect to movement along at least one axis.

7. The position sensor as claimed in claim 2, wherein the at least one positioning element is arranged on the carrier module such that the at least one positioning element secures the sensor module with respect to an ability to move along two axes that are arranged at a right angle to one another.

8. The position sensor as claimed in claim 1, wherein the encapsulation edge face has a flange surrounded by the deformed domes.

9. The position sensor as claimed in claim 1, wherein the deformed domes surround the leadframe in at least one of encapsulated regions and regions that are not encapsulated.

10. The position sensor as claimed in claim 9, wherein the domes engage in recesses in the leadframe when the sensor module is inserted into the carrier module.

11. The position sensor as claimed in claim 9, wherein each of the electrical connections of the sensor module is bent relative to the leadframe of the sensor module by a strain-relief geometry, configured as at least one of a radius and a plurality of angled portions.

12. The position sensor as claimed in claim 1, wherein the respective free end of each of the at least two domes is deformed by at least one of hot-caulking and heating by one of light, infrared, or laser irradiation and subsequent forming.

13. The position sensor as claimed in claim 1, wherein the carrier module has at least two support elements and at least one dome is arranged on each support element, each support element having a support area that has an elevated position relative to a surface of the carrier module, wherein the sensor module is arranged at a distance from the surface of the carrier module when supported on the support areas.

14. The position sensor as claimed in claim 13, wherein the at least two domes are integrally formed with the respective support elements.

15. The position sensor as claimed in claim 13, wherein the support elements are integrally formed with the carrier module.

16. The position sensor as claimed in claim 13, wherein an elastic layer, configured as one or more of an elastomeric film, a damping mat, a gel, or a pasty layer, is arranged between the carrier module and the sensor module.

17. The position sensor as claimed in claim 1, wherein regions of the leadframe which are not encapsulated have recesses for one of domes and positioning elements.

18. The position sensor as claimed in claim 17, wherein the recesses are configured as at least one of bores, elongate holes, and recesses that are open on one side.

19. The position sensor as claimed in claim 17, wherein the one of the domes and the positioning elements are arranged in the recess.

20. The position sensor as claimed in claim 1, wherein the electrical contact connections of the carrier module are arranged substantially perpendicular to a base plate of the carrier module.

21. The position sensor as claimed in claim 20, wherein the electrical contact connections of the carrier module are arranged an angle of 50°-130° with respect to the base plate.

22. The position sensor as claimed in claim 1, wherein the position sensor is an angle sensor.

* * * * *